United States Patent [19]
Dashner

[11] 3,899,196
[45] Aug. 12, 1975

[54] FIRE HYDRANT
[75] Inventor: James W. Dashner, Elmira, N.Y.
[73] Assignee: International Telephone and Telegraph Corporation, Nutley, N.J.
[22] Filed: June 6, 1973
[21] Appl. No.: 367,622

[52] U.S. Cl. .................. 285/2; 85/61; 285/363; 285/422
[51] Int. Cl.[2] .......................... F16L 35/00
[58] Field of Search .............. 285/2, 3, 4, 422, 363, 285/93, 114; 137/68, 293, 294, 295, 296, 297, 797; 403/2; 85/61, 62; 75/200; 29/182; 151/30

[56] References Cited
UNITED STATES PATENTS

| | | | |
|---|---|---|---|
| 1,530,679 | 3/1925 | Lambert | 285/2 |
| 2,083,054 | 6/1937 | Cline | 285/2 |
| 2,549,939 | 4/1951 | Show et al. | 75/200 X |
| 3,219,369 | 11/1965 | Little | 285/363 |
| 3,234,986 | 2/1966 | Welles | 85/62 |
| 3,331,397 | 7/1967 | Mueller et al. | 285/2 X |
| 3,404,903 | 10/1968 | Frantz | 285/363 X |
| 3,650,550 | 3/1972 | West | 285/363 |

Primary Examiner—Dave W. Arola
Attorney, Agent, or Firm—John T. O'Halloran; Menotti J. Lombardi, Jr.; Peter Van Der Sluys

[57] ABSTRACT

Flanged upper and lower standpipe sections are connected by a plurality of bolts and frangible powdered metal nuts to form a fire hydrant. Compression washers are disposed between the bolt heads and a flange to properly preload the nuts. An outer annular portion of the surface of one flange is recessed to allow the upper standpipe to pivot about a point on an inner portion of the surface of the lower standpipe flange when the hydrant is struck by a vehicle.

11 Claims, 4 Drawing Figures

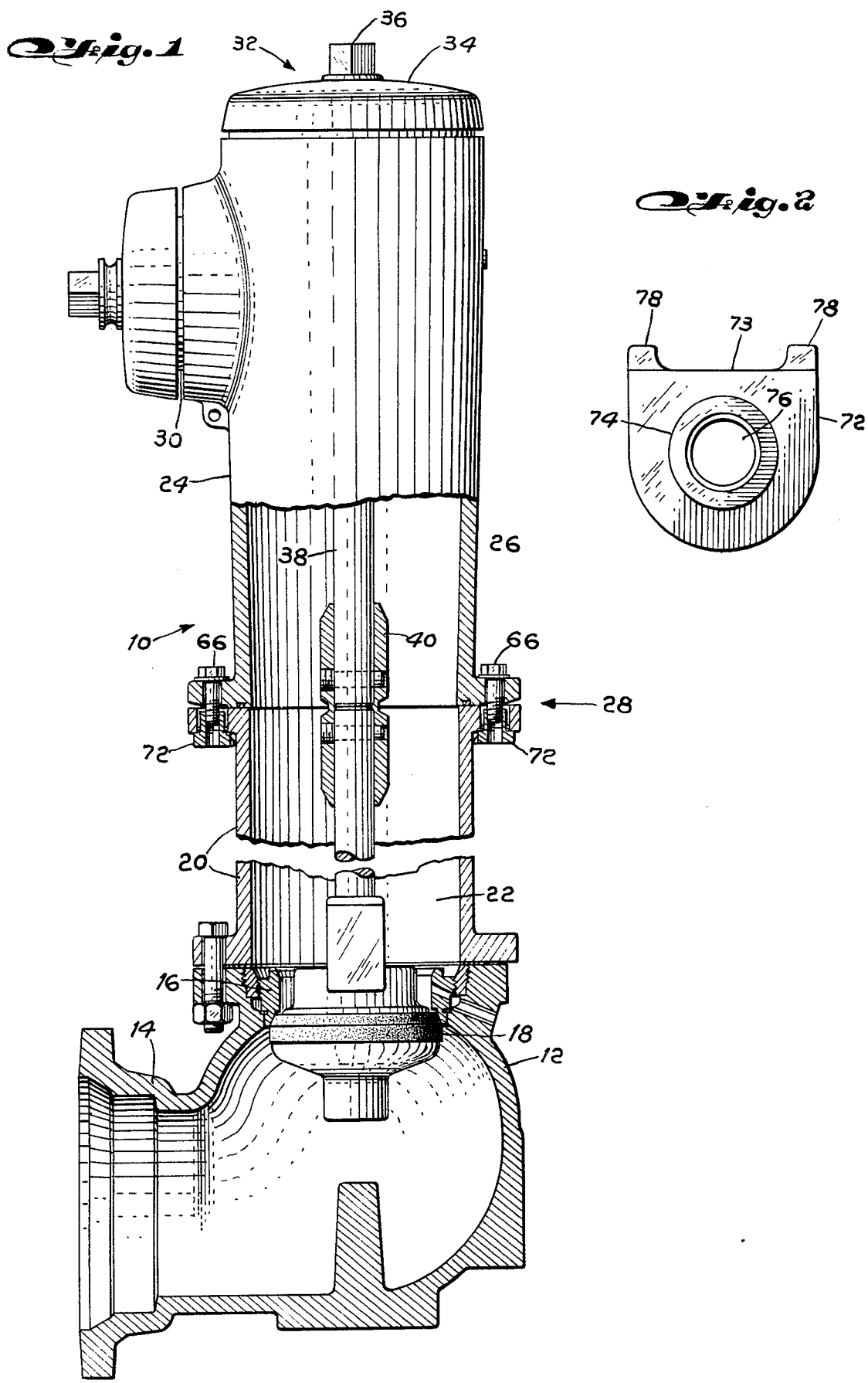

FIRE HYDRANT

BACKGROUND OF THE INVENTION

1. Field of the Invention

The present invention relates to fire hydrants and more particularly to a fire hydrant having an upper standpipe that may be broken away from a lower standpipe without damaging the essential components of the hydrant or allowing water to escape.

2. Description of the Prior Art

In accordance with present day standards and conventions, fire hydrants include upper and lower standpipes joined about flanged connections. When a hydrant is installed, the lower standpipe is buried partially in the ground for supporting the upper standpipe. It is now recognized as desirable for some installations that the connection between the upper and lower standpipes be made frangible so that if the hydrant is struck by a vehicle the upper standpipe will break free at the frangible connection without turning on the water or damaging the functional parts of the hydrant or the vehicle.

Heretofore, frangible connections have been provided in various forms. Breakable threaded coupling rings formed of cast iron are disclosed in U.S. Pat. Nos. 1,883,467 and 1,944,777 issued to F.R. Banks. Other forms of frangible connections included the use of bolts having reduced diameter portions or breakaway cast iron lugs or flanges having grooves formed therein to provide weakened sections. U.S. Pat. No. 1,530,679 issued to F. Lambert discloses a breakable or separable joint for water meters wherein a cast iron nut is utilized.

The more complex cast iron components such as threaded coupling rings had to be machined and finished and as a result the cost became somewhat excessive and for this reason the device was undesirable. In devices using less complex cast iron components it was not necessary that the components be machined to the extent required of the more complex devices. However, all of these devices required a special flange on one of the standpipes to accommodate the breakaway connection. The special flange could not be used for the standard non-breakable hydrant and as a result an inventory problem arose. It became necessary to stock standpipes in all lengths and configurations for both the breakaway hydrants and the standard hydrants which are still in demand. It was therefore necessary to provide castings for all these sizes and configurations for both breakable and standard hydrants. Considering the size and weight of these devices, considerable funds were expended to provide storage for the necessary inventory.

In an attempt to provide a frangible connection for conventional standpipes, bolts were developed having a reduced diameter to form a weakened portion. These bolts did not prove satisfactory because of their inherent ductility. The bolts would stretch and bend before fracturing causing considerable damage to both the hydrant and the vehicle before the hydrant would breakaway.

Many of the grooved type of devices had weakened sections that were exposed to external blows and as a result many of the devices were damaged during shipment and installation.

Substantial hydrant damage was experienced with prior art devices that included upper and lower standpipes having flanges with abutting surfaces. When the upper standpipe of the hydrant was struck by a vehicle the frangible connection would rupture and the upper standpipe would cantilever about a fulcrum point on the outermost portion of the lower flange surface. The outermost portion is the weakest portion of the flange and the force exerted by the pivoting upper standpipe resulted in damage to the flange. In many instances it was necessary to excavate and replace the lower standpipe because the damaged flange could not be resealed.

Thus, the prior art devices all suffered from one or more deficiencies. The cost of some devices was high because of the machining and finishing required. Other devices required high cost for castings and resulted in high inventory costs, while the devices using frangible bolts were not satisfactory.

SUMMARY OF THE INVENTION

The present invention provides a safety top fire hydrant wherein the upper portion of the hydrant may be broken away from the lower portion, when struck by a vehicle, without turning on the water or substantially damaging the essential components of the hydrant or the vehicle. This desirable result is achieved by a unique combination of structural components.

The upper and lower standpipes have flanges with juxtaposed annular surfaces that are connected by a plurality of bolts and frangible nuts. The frangible nuts are formed from compressed iron powder and are manufactured to have controlled physical characteristics. The unique use of powdered metal nuts provides controlled physical characteristics within a range attainable by the materials of the prior art, only at additional cost. The machining and finishing procedures associated with some cast iron devices is practically eliminated by using the powdered metal components thereby reducing the component cost.

Compression washers having predetermined characteristics are disposed between the heads of the bolts and a flange to provide both torque control and preloading of the frangible nut. During assembly, the tensile strength of the frangibe nuts may easily be exceeded unless controlled torque is applied to the bolt. The characteristics of the compression washers are such that when the washers become flat the proper torque is applied to the bolts. Thus, breakage of the nuts is avoided during installation by tightening the bolts until the washers are flattened. The washers also function to uniformly preload the nuts and avoid a tendency for the bolts to turn slightly during shipment and installation of the hydrant which would cause the connection to become loose. The compression washer assures a constant preloading of the nut even if the bolt turns a slight amount.

The juxtaposed annular surface of one flange includes the following annular portions: a flat innermost portion in contact with the surface of the other flange; a raised stepped portion; and an outermost beveled portion. Since the flat portion is positioned innermost, the upper standpipe pivots about a point on the surface of the lower standpipe flange that is innermost and adjacent the wall of the standpipe and not on the weaker outermost edge of the flange. Thus, the flange damage experienced with the prior art is greatly reduced While the flange of one standpipe is recessed, the standpipe is still compatible with conventional hydrants and the effective inventory requirements are reduced to one half. The number of castings required is reduced and the manufacturing cost is also greatly reduced.

Accordingly, it is an object of the present invention to provide a safety top fire hydrant tht may be struck by a vehicle without turning on the water or incurring any substantial damage to the essential components of the hydrant or the vehicle.

Another object of the present invention is to provide a fire hydrant with frangible nuts having a predetermined tensile strength.

Another object of the invention is to provide a less expensive frangible connection for a safety top fire hydrant.

Another object of the invention is to provide a frangible connection for a safety top hydrant that does not require a special standpipe flange so that the standpipes are compatible with both breakaway and standard hydrants.

The foregoing and other objects and advantages of the present invention will become more apparent from the following description and the accompanying drawings wherein one embodiment of the present invention is described.

DESCRIPTION OF THE DRAWINGS

FIG. 1 is an elevation view of the present invention shown partially in section.

FIG. 2 is a partial vertical section showing the frangible connection of the present invention.

DESCRIPTION OF THE PREFERRED EMBODIMENT

Figure 3:
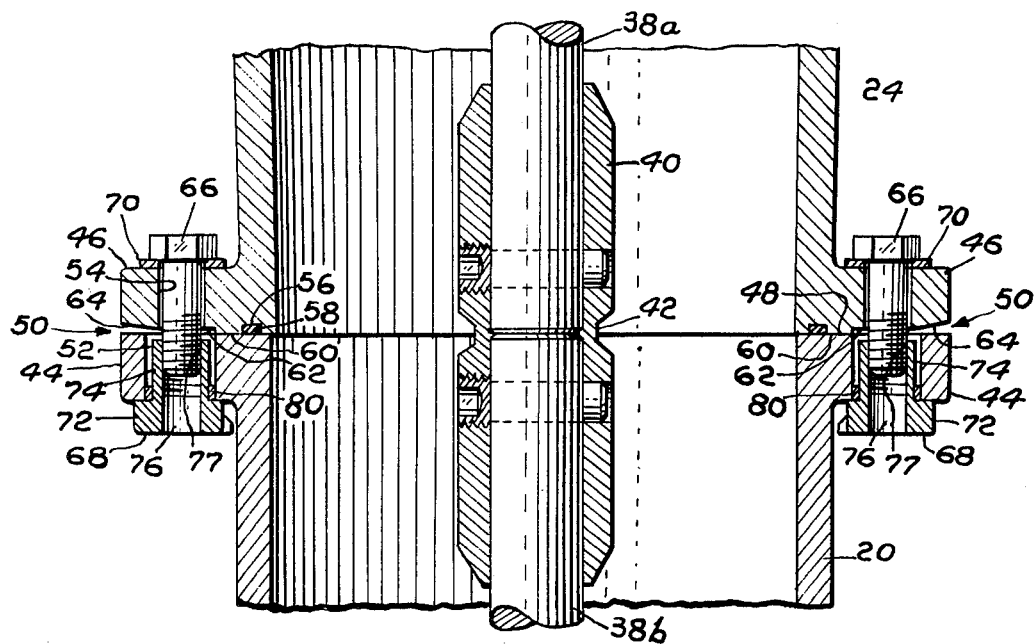
FIG. 3 is a plane view of the frangible nut taught by the present invention.

Referring to FIG. 1, a fire hydrant 10 is shown comprising a conventional elbow valve 12 for connection to an underground water system, not shown. The valve 12 includes a body member 14, a valve seat ring 16 and a valve member 18. A lower standpipe section 20 of the hydrant having a central fluid passage 22 is connected to the top of the valve body 14 by flanges. An upper standpipe section 24 having a central fluid passage 26 is connected to the lower section 20 by a frangible connection 28. Conventional fire hose connections 30 near the upper end of the upper standpipe section 24 communicate with the central fluid passages 22 and 26. The upper standpipe section 24 extends beyond the fire hose connections 30 and terminates with a cover plate 32 to close the end of the central fluid passage 26. The cover plate 32 may be cast and includes a top portion 34 which has a diameter substantially equal to the diameter of the outer cylindrical surface of the upper standpipe section 24. The upper surface of top portion 34 is shaped for drainage and appearance. A stem nut 36 extends through the cover plate 32 and is connected to a valve stem 38 which is positioned in the fluid flow passages of the upper and lower standpipe sections for connection to the valve member 18. Rotation of the stem nut 36 rises or lowers the stem 38 to close or open the valve 18.

Referring to FIG. 2, there is shown a vertical section of a portion of hydrant 10. A frangible cast iron stem coupler 40 connects an upper portion 38a of stem 38 to a lower portion 38b of stem 38. The stem coupler has a peripheral groove 42 formed therein to define a weakened portion adjacent the ends of the upper and lower stem portions. The stem coupler may be constructed in accordance with the teachings of U.S. Pat. No. 1,944,777 issued to F.R. Banks.

The lower standpipe 20 has a flange 44 formed at the upper end thereof and the upper standpipe 24 has a flange 46 formed at a lower end thereof. Flanges 44 and 46 have juxtaposed annular surfaces 48 and 50. Flanges 44 and 46 have a plurality of holes 52 and 54 formed therein and spaced equally thereabout. The holes 52 have a diameter of 0.0938 inch. Standpipes 20 and 24 are positioned so that the holes 52 and 54 coincide when surfaces 48 and 50 are juxtaposed.

Surface 50 of flange 46 comprises three separate annular portions disposed radially outwardly from each other. A flat portion 60 is in contact with surface 48 of flange 44 and has an annular groove 56 formed therein for receiving a 0-ring 58 to form a seal between the upper and lower standpipes. A raised step portion 62 includes holes 54 and a beveled portion 64 is formed at the outermost region. The raised portion 62 is spaced approximately 0.045 inch from surface 48 of the lower flange and the beveled portion 64 is formed at an angle of approximately 10° and has a width of approximately ⅜ of an inch.

A plurality of bolts 66 extend into holes 52 and 54 and are threaded into breakaway nuts 68. Compression washers 70 such as bellville washers are positioned between the heads of bolts 66 and flange 46 for purposes which will be subsequently discussed. The compression washers are designed to flatten when a torque of 25 to 30 foot pounds is exerted thereon. The compression washers could also be positioned between nuts 68 and flange 44 to achieve the same result.

Each breakaway nut 68 has a flanged portion 72, a shank portion 74 having an outer diameter of 23/32 of an inch and an opening 76 formed axially through the shank portion and the flanged portion. Each opening 76 is partially threaded at 77 to receive a bolt 66. Each flanged portion 72 has a straight side 73 with a pair of ears 78 formed thereon as most clearly shown in FIG. 3. Breakaway nuts 68 are positioned so that ears 78 engage the outer surface of the lower standpipe 20 to prevent rotation thereof. Spacers 80 are disposed between the shank portions 74 of nuts 68 and the surfaces of holes 52 for purposes of centering nuts 68 within holes 52.

Breakaway nuts 68 have controlled physical characteristics and are formed of compressed iron powder with traces of carbon and copper. During manufacture, the density of the iron powder is controlled to provide a tensile strength of 38,000 – 45,000 psi. Through controlled compression and sintering of the iron powder specified, physical characteristics may be obtained within a reasonable range. The breakaway nuts have zero ductility much like cast iron and has a predetermined tensile strength.

The mold used to form the breakaway nuts is designed to provide a nut with a hole already formed therein. Since powdered metal components are porous, the nuts are plastic filled with vinyl to facilitate taping of the holes and subsequent plating. After the threads are formed in holes 76, the nuts are electroplated with zinc to provide a weather resistant surface. By using a powdered metal to form the nuts, the tensile strength of the nuts is controlled to a predetermined value and the cost is reduced since the finishing steps required for cast iron components are not necessary.

Figure 4:
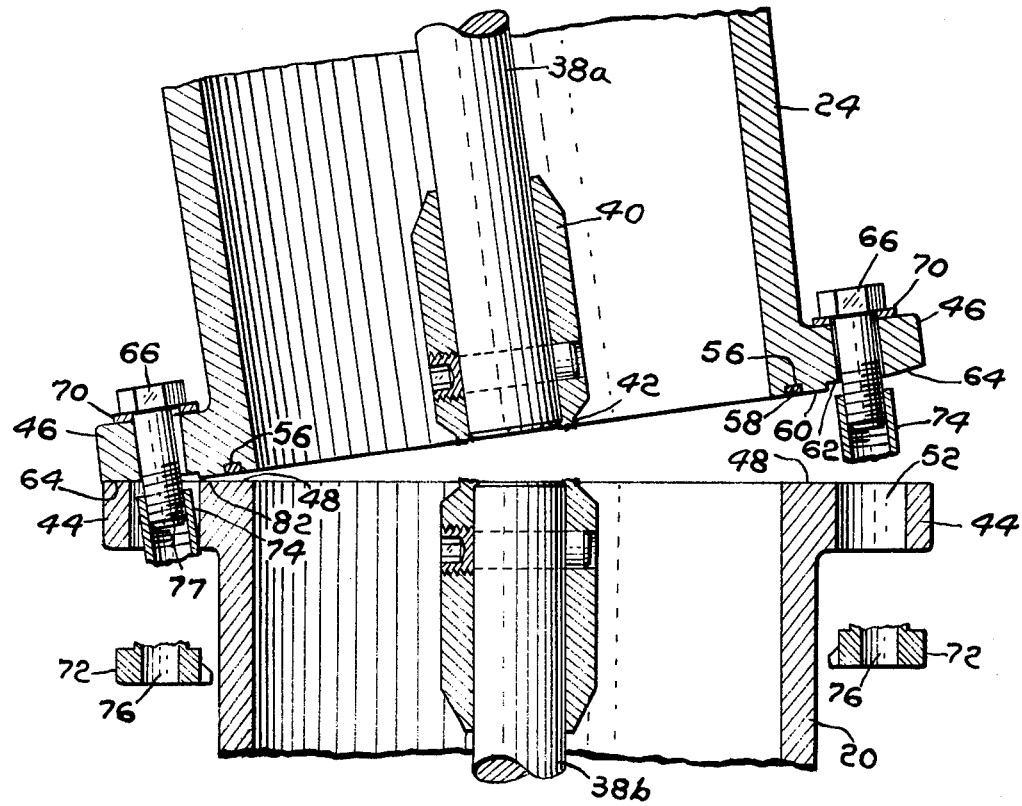
FIG. 4 is a vertical section similar to that of FIG. 2 showing the hydrant parts in the positions assumed after the hydrant has been subjected to a fracturing blow.

If the hydrant is struck by a vehicle, the upper standpipe 24 forms a cantilever with a fulcrum point on surface 48 of flange 44 as shown in FIG. 4. The upper standpipe exerts a force on nuts 68 through bolts 66 which causes them to fracture as shown in FIG. 4. The stem coupler 40 also fractures about groove 42 so that the entire upper portion of the hydrant breaks free from the lower standpipe 20.

The upper standpipe 24 pivots about a fulcrum point 82 on surface 48 of flange 44. Point 82 is nearly in line with the wall of the lower standpipe where the flange receives support from the wall. By providing raised portion 62 and beveled portion 64, point 82 is shifted inwardly so as to be substantially in line with the wall rather than at the weaker outer edge of flange 44. By shifting point 82 inwardly to the stronger portion of the flange, much of the damage experienced with the prior art is eliminated and in most cases the flanges may merely be rebolted without the need for replacement.

It is to be understood that the raised portion 62 and beveled portion 64 form one embodiment of a recessed outermost annular portion of surface 50 and that the recess could be provided in several different shapes so long as the clearance between the recessed portion and surface 48 of flange 44 is sufficient to allow the upper standpipe to pivot about a point adjacent the wall of the lower standpipe until the breakaway nuts fracture. Thus, the recess could comprise just a step or a beveled portion so long as sufficient clearance is provided for the upper standpipe to pivot. it is also contemplated that the recess could be formed in surface 48 or both surfaces 48 and 50 could be recessed.

It is to be noted that a space of approximately 0.11 inch is provided between shanks 74 and the surfaces of holes 52. This space is essential to allow shanks 74 to clear holes 52 anad to assure that the shanks do not jam in the holes when the hydrant breaks away. The size of the space required is dependent upon the length of the shank and it is to be understood that the invention is not limited to any specific dimensions.

The compression washers 70 facilitate proper tensioning of bolts 66 and provide a preload on nuts 68. Breakaway nuts 68 fracture under a torque of 70–75 foot pounds and the washers are designed to flatten under a torque of 25–30 pounds. Thus, the washers provide an indication as to when sufficient torque has been applied to bolts 66. There is a tendency for bolts 66 to turn somewhat during shipping and installation of the hydrant. Through the unique use of the compression washers, a constant preloading force is maintained on nuts 68 even in the event that bolts 66 turn a slight amount. The washers also provide an indication as to when the bolts are properly torqued thereby eliminating the fracturing of bolts during assembly of the hydrant.

The breakaway nuts fracture about the shanks as shown in FIG. 4. The shanks are normally disposed within holes 52 and are protected by flange 44 from external blows. The flange also has a tendency to protect the shank portion from the elements and thus corrosion is somewhat reduced.

While the described embodiment is preferred, because the breakaway nuts are protected by the flange 44, other embodiments utilizing the concept of powdered metal components and compression washers are considered to be within the scope of the invention. It is not necessary that both flanges include holes but rather it is contemplated that the flanges of the powdered metal nuts could engage the outer edge of a standpipe flange that has a diameter smaller than the diameter of the flange through which the bolts extend. In such an embodiment, a conventional nut could be used in combination with a powdered metal lug that engages the flange. While such an embodiment would provide an improved frangible connection, the inventory problems associated with the prior art devices would still be experienced.

Thus, the present invention provides a safety top hydrant that will breakaway when struck by a vehicle without turning on the water or damage to any of the essential components of the hydrant or the vehicle. The hydrant has a frangible connection using powdered metal nuts that are inexpensive to manufacture and have a controlled tensile strength. The upper standpipe is designed to pivot on a point adjacent the wall of the lower standpipe so that the flange of the lower standpipe is not damaged and need not be replaced after the hydrant is struck. Compression washers are used to provide preloading of the nuts and to assure proper torquing of the bolts.

While the principles of the invention have been described in connection with a specific structure, it is to be clearly understood that this description is made only by way of example and not as a limitation to the scope of the invention as set forth in the objects thereof and in the accompanying claims.

I claim:

1. A fire hydrant comprising:
    a lower standpipe having an outwardly extending flange on an upper end thereof;
    an upper standpipe having an outwardly extending flange on a lower end thereof, said flanges having juxtaposed annular surfaces;
    connecting means engaging both of said flanges and connecting said standpipes, at least a portion of said connecting means being formed of a frangible material having a tensile strength controlled within a selected range considerably less than that of the standpipes; and
    pivot forming means formed on one of said juxtaposed annular surfaces and disposed inwardly of said connecting means for providing a pivot point on an inner portion of the juxtaposed surfaces, whereby said connecting means fractures if the hydrant is struck by a vehicle and the upper standpipe pivots about said pivot forming means at a point on the inner portion of juxtaposed surfaces so that the flanges are not damaged when the upper standpipe breaks away.

2. A fire hydrant as described in claim 1, wherein the frangible material is compressed powdered metal.

3. A fire hydrant, comprising;
    a lower standpipe having an outwardly extending flange on an upper end thereof;
    an upper standpipe having an outwardly extending flange on a lower end thereof, said flanges having juxtaposed annular surfaces;
    a plurality of openings formed in at least one of said flanges;
    bolt means disposed in said openings and having heads engaging one of said flanges;

engaging means threadedly connected to said bolt means for engaging the other of said flanges and for connecting the upper and lower standpipes, at least a portion of one of said bolt means and engaging means being formed of a frangible material having a tensile strength controlled within a selected range less than the tensile strength of the standpipes;

means formed on one of said bolt means and engaging means for preventing rotation thereof and the other of said means being adapted to be turned for tightening said threaded connection; and torque indicating means disposed between said bolt means and said engaging means for providing an indication when the threaded connection is properly torqued, whereby the possibility of fracturing the frangible material during assembly in the field is reduced while said frangible material fractures and the upper standpipe breaks away if the hydrant is struck by a vehicle.

4. A fire hydrant as described in claim 3, wherein said torque indicating means comprises compression washers which collapse when the connection is tightened to a predetermined torque.

5. A fire hydrant comprising:

a lower standpipe having an outwardly extending flange on an upper end thereof;

an upper standpipe having an outwardly extending flange on the lower end thereof, said flanges having juxtaposed annular surfaces;

a plurality of aligned holes formed in said flanges;

bolt means disposed in said holes, said bolt means having heads for engaging one of said flanges;

engaging means connected to said bolt means for engaging the other of said flanges and for connecting the standpipes, at least one of said bolt means and said engaging means being formed of a frangible material having a tensile strength controlled within a range considerably less than the strength of the standpipes; and means formed on at least one of said flanges for providing a pivot point inwardly of said holes so that the upper standpipe pivots about said point on an inner portion of the juxtaposed annular surface of the lower standpipe when a vehicle strikes the hydrant and fractures the frangible material.

6. A fire hydrant as described in claim 5, wherein said frangible material comprises compressed powdered metal.

7. A fire hydrant, comprising:

a lower standpipe having an outwardly extending flange on an upper end thereof;

an upper standpipe having an outwardly extending flange on a lower end thereof, said flanges having juxtaposed annular surfaces;

a plurality of openings formed in at least one of said flanges;

bolt means disposed in said openings and having heads for engaging one of said flanges;

nut means threadedly connected to said bolt means for engaging the other of said flanges and connecting the upper and lower standpipes, at least a portion of one of said bolt means and said nut means being formed of a frangible material having a tensile strength controlled within a selected range considerably less than that of the standpipes;

means formed on one of said bolt means and nut means for preventing rotation thereof and the other of said means being adapted to be turned for tightening said threaded connection;

torque indicating means disposed between said bolt and nut means for collapsing and thereby providing an indication that a predetermined torque has been applied to said threaded connection; and pivot forming means formed on one of said juxtaposed annular surfaces at a position inwardly of said openings, whereby said torque indicating means assists in preventing accidental breakage of the frangible material during field assembly by providing an indication of proper torquing of the bolt and the frangible material fractures to allow the upper standpipe to break away if it is struck by a vehicle, the upper standpipe pivoting about the pivot forming means so that force is exerted on an inner portion of the flange near the pipe body where the greater flange strength prevents damage to the flange.

8. A fire hydrant, comprising:

a lower standpipe having an outwardly extending flange on an upper end thereof;

an upper standpipe having an outwardly extending flange on a lower end thereof, said flanges having juxtaposed annular surfaces;

a plurality of openings formed in at least one of said flanges;

bolt means disposed in said openings and having heads engaging one of said flanges;

engaging means threadedly connected to said bolt means for engaging the other of said flanges and for connecting the upper and lower standpipes, at least a portion of one of said bolt means and engaging means being formed of a frangible material having a tensile strength controlled within a selected range less than the tensile strength of the standpipes;

means formed on one of said bolt means and engaging means for preventing rotation thereof and the other of said means being adapted to be turned for tightening said threaded connection; and compression washers disposed between said bolt means and said engaging means for collapsing and thereby providing an indication when the threaded connection is properly torqued.

9. A fire hydrant, comprising:

a lower standpipe having an outwardly extending flange on an upper end thereof;

an upper standpipe having an outwardly extending flange on a lower end thereof, said flanges having juxtaposed annular surfaces with a plurality of aligned openings formed therein, at least one of said flanges having an outer annular portion of the juxtaposed annular surface recessed;

bolt means disposed in said openings and having heads engaging one of said flanges;

engaging means threadedly connected to said bolt means for engaging the other of said flanges and for connecting the upper and lower standpipes, at least a portion of one of said bolt means and engaging means being formed of a frangible material having a tensile strength controlled within a selected range less than the tensile strength of the standpipes;

means formed on one of said bolt means and engaging means for preventing rotation thereof and the other of said means being adapted to be turned for tightening said threaded connection; and torque indicating means disposed between said bolt means and said engaging means for providing an indication when the threaded connection is properly torqued, whereby the possibility of fracturing the frangible material during assembly in the field is reduced while said frangible material fractures and the upper standpipe breaks away and pivots about a point inwardly of said openings on an inner portion of the juxtaposed annular surface of the lower standpipe if the hydrant is struck by a vehicle.

10. A fire hydrant as described in claim 9, wherein the torque indicating means comprises compression washers which collapse when the connection is tightened to a predetermined torque.

11. A fire hydrant as described in claim 9, wherein said frangible material comprises compressed powdered metal.

* * * * *